United States Patent [19]

Schelhaas

[11] 4,170,578

[45] Oct. 9, 1979

[54] AQUEOUS RAPID-DRYING PRINTING INK

[75] Inventor: Ealbertus W. Schelhaas, Heiloo, Netherlands

[73] Assignee: O+R Inktchemie N.V., Zaandam, Netherlands

[21] Appl. No.: 781,779

[22] Filed: Mar. 28, 1977

[30] Foreign Application Priority Data

Apr. 16, 1976 [GR] Greece .................................... 50571
Oct. 21, 1976 [NL] Netherlands .......................... 7611671

[51] Int. Cl.$^2$ .................... C09D 11/02; C09D 11/08; C09D 11/10; C09D 11/14
[52] U.S. Cl. .......................... 260/17.2; 260/17.4 ST; 260/25; 260/26; 260/27 R; 260/DIG. 38; 101/426; 101/450
[58] Field of Search ............... 106/20, 25, 30; 260/25, 260/DIG. 38, 26, 17.4 ST, 17.2

[56] References Cited

U.S. PATENT DOCUMENTS

| | | | |
|---|---|---|---|
| 3,010,833 | 11/1961 | Cataldo | 106/26 |
| 3,256,102 | 6/1966 | Arounowa | 106/25 X |
| 3,389,007 | 6/1968 | Oda et al. | 106/20 X |
| 3,615,751 | 10/1971 | Lecha et al. | 106/25 |

OTHER PUBLICATIONS

Netherlands Application Ser. No. 7504805, assigned to O+R Inktchemie N.V., filed 4-23-75; Publ'd. 10-26-76 by Derwent Publications Ltd.

*Primary Examiner*—Allan Lieberman
*Attorney, Agent, or Firm*—Amster, Rothstein & Engelberg

[57] ABSTRACT

A printing ink which rapidly dries under the influence of heat, in particular from infra-red radiation, wherein in addition to a hydrophobic phase which is composed of a non-polar solvent, a modified phenol or cresol formaldehyde resin, a crosslinkable unsaturated polyester, a peroxide catalyst for said polyester, and a pigment, the ink moreover comprises an aqueous phase constituting at least 12 wt.% of the total ink.

13 Claims, No Drawings

AQUEOUS RAPID-DRYING PRINTING INK

The invention relates to a rapid-drying printing ink and a printing process using same.

In Dutch patent application No. 75,04805 in the name of applicant is described a printing ink which after printing can be rapidly dried by exposing the printed material to the influence of heat, in particular from infra-red radiation. This printing ink is composed of:
a non-polar solvent,
a modified phenol- or cresol formaldehyde resin,
a crosslinkable unsaturated polyester,
a peroxide catalyst for said polyester and
a pigment.

Such a printing ink can be uesed in various printing processes, inter alia in planographic printing and in relief printing, and offers important advantage as is described in the said Dutch patent application.

Now it has been found that in a number of respects still further improvements are obtained when the printing ink, in addition to the hydrophobic phase as described above, moreover comprises an aqueous phase constituting at least 12 wt.% of the total ink.

In fact, the aqueous phase replaces part of the non-polar solvent as the carrier medium of the printing ink, so that owing to the easy evaporation of the water an even more rapid drying is obtained. Moreover there is required less ink to obtain the same covering; so the ink consumption is lower. Finally, the printed ink layer shows a somewhat higher gloss.

As usual, the aqueous phase may consist of water, to which have been added substances for obtaining a relatively stable emulsion in the hydrophobic phase of the printing ink. As such substances may be mentioned: monohydric alcohols, such as methyl alcohol and isopropyl alcohol, diols polyols, such as glycerol, butyl carbitol and ammonium stearates. The amount to be added of these substances may vary within wide limits, and the optimum concentration in a specific case may be easily determined by means of simple tests.

The emulsification of the aqueous phase may also be promoted by replacing part, e.g. about 10%, of the normal hard resin used as the binder of the printing ink by a more hydrofilic hard resin.

However, an aqueous phase having a relatively low viscosity sometimes may be expelled yet from the ink during printing, so that there is observed a phase separation in the ink fountain of the printing press.

This demixing phenomenon is of course undesirable and may be avoided by incorporating in the aqueous phase a bodying agent, the nature and the amount of the bodying agent used preferably being so selected that the viscosity of the aqueous phase and the viscosity of the hydrophobic phase are substantially the same. Then there is reached a sort of visco-elastic equilibrium or apparent homogeneity, at which the printing ink is optimally resistant to the heavy mechanical load on the printing press without the occurrence of demixing. A higher viscosity of the aqueous furthermore leads to an even more rapid setting of the printed ink layer upon heating, so to an even smaller chance of transfer and an even more rapid complete drying.

Suitable bodying agents for the aqueous phase are inter alia partially oxidized or modified starches which have been rendered soluble by gelatinization, sodium carboxymethyl cellulose, sodium alginate and gums, such as gum arabic, tragacanth gum et. Dependent on the nature of the bodying agent used and on the desired viscosity of the aqueous phase, which in turn preferably is attuned as much as possible to the viscosity of the hydrophobic phase as described above, the amount of the bodying agent used may vary within wide limits and, for example, ranges between 0.5 and 20 wt.%.

The separately prepared aqueous phase, which in addition to the above-described components may contain other additives, such as buffering substances, oxidants, accelerators, bactericides, e.g. paraformaldehyde to prevent deterioration of the bodying agent, waxes, e.g. polyethylene wax, and latexes, is usually emulsified uniformly in the likewise separately prepared hydrophobic phase by an intensive stirring treatment according to known techniques. In doing so, the mixing ratio thereof is so selected that the aqueous phase constitutes at least 12 wt.% of the total ink, and preferably 15–25 wt.%. Normally, the aqueous phase will not exceed a concentration of 35–40 wt.%.

The hydrophobic phase, also called the ink phase, contains as essential components a non-polar solvent, a modified phenol- or cresol formaldehyde resin, a crosslinkable unsaturated polyester, a peroxide catalyst for said polyester, and a pigment.

In the hydrophobic phase the resin and the polyester, together forming the binder, are present in dissolved state. In fact the polyester keeps the resin in solution, because it sees to it that the threshold concentration of binder is passed, below which the resin is not soluble in the non-polar solvent. By the influence of the heat, in particular from infra-red radiation, on the wet ink layer the peroxide catalyst is activated, as a result of which free radicals are produced which initiate a rapid crosslinking of the unsaturated polyester. The crosslinked polyester is not soluble in the non-polar solvent, so that said threshold concentration is no longer reached and the resin expels the non-polar solvent, which is subsequently absorbed by the printed substrate. By means of this particularly rapid process an effective drying of the ink layer is obtained in a simple manner. In practice excellent results are obtained when the weight ratio of the resin and polyester together to the non-polar solvent is greater than 1/1, while the weight ratio of the resin only to the non-polar solvent is smaller than 1/1.

The non-polar solvent used according to the invention usually is a hydrocarbon mixture conventional in printing inks, such as a paraffinic oil having an aliphatic nature obtained by distillation of petroleum, but which may contain minor amounts of aromatics or naphthenes.

As modified phenol- or cresol formaldehyde resin are used the conventional resins of this type, it being preferably modified with colophony and most preferably subsequently further esterified with a polyhydric alcohol, such as glycerol, pentaerytritol, sorbitol and the like. These resins are only compatible with non-polar organic solvents when the total quantity of binder passes a specific minimum concentration (treshold concentration). Below this concentration expulsion takes place.

The crosslinkable unsaturated polyester is preferably is preferably composed of three types of components, namely units derived from a polyhydric alcohol, such as glycerol, pentaerytritol, manitol or sorbitol, units derived from a phthalic acid, preferably isophthalic acid, and units derived from an unsaturated aliphatic acid, most preferably linoleic acid and/or linolenic acid, which latter units mostly constitute the greatest part by weight of the polyester.

The peroxide catalyst may be composed of a conventional organic peroxide or hydroperoxide and a siccative. The peroxide or hydroperoxide is preferably used in an amount of 1-5 wt.%, calculated on the total binder (resin plus polyester). As suitable compounds may be mentioned cumene hydroperoxide and cyclohexanone peroxide.

Siccatives, which are used in combination with the conventional organic peroxide or hydroperoxide, are the likewise conventional siccatives. As such can be used soaps of a trivalent metal, e.g. trivalent vanadium, iron, manganese or cobalt. Cobalt soaps are preferred, such as cobalt naphthenate, cobalt resinate, cobalt stearate or cobalt octoate. he siccative is usually added in an amount of 0.2-2 wt.%, calculated on the total binder.

According to this embodiment the conventional organic peroxide or hydroperoxide may not be added too long before printing, preferably to the otherwise ready printing ink, wherein therefore the aqueous phase is already emulsified. At a normal temperature of about 20° C. the storage time of the thus mixed ink ready for printing is then about 24 hours. However, taking this into account, it will be possible to obtain a smoothly going printing process and a very rapid drying of the ink layer by the influence of heat, preferably originating from infra-red radiation. This latter to a very high extent activates the influence of the siccative on the peroxide or hydroperoxide, so that rapidly free radicals are formed which immediately initiate the crosslinking of the unsaturated polyester, which results in a rapid drying of the ink layer as earlier described.

However, the peroxide catalyst preferably is an organic peroxide which is decomposed at a temperature between 70° and 80° C. with formation of free radicals initiating the crosslinking of the polyester. The required decomposition temperature is obtained by the influence of heat, preferably originating from infra-red radiation. Below a temperature of 70° C. the thermally decomposable organic peroxides are particularly stable, so that the ink ready for printing can be stored for a long time, namely for about twelve months at a temperature of about 20° C. This is an important advantage, since this renders it possible to prepare a ready ink, to market same and to keep same in stock. Suitable thermally decomposable organic peroxides are inter alia isobutyl peroxide, dibenzoyl peroxide and tert.butylperoxy-2-ethyl hexoate, which all decompose at a temperature of 70° C. These organic peroxides are mostly added in an amount of 1-6 wt.%, calculated on the total binder. An ink prepared with these thermally decomposable peroxides has excellent properties on the printing press; it causes practically no deposition of solid material on the rollers and ensures a rapid an effective drying of the applied ink layer upon heating, most preferably by means of infra-red radiation.

When a thermally decomposable peroxide is used no siccative need be used, which is the case, though, when there are used the earlier described conventional organic peroxides or hydroperoxides. However, the drying can yet be extra accelerated by furthermore adding to the printing ink an activator for the thermally decomposable peroxide. This may be useful when a thick ink film is printed. Particularly effective activators are tertiary amines, e.g. dimethyl-p-toluidine, which may be added in a very small amount, namely an amount of 0.05-0.4%. As a result of the presence of these activators the storage life of the ready printing ink is reduced somewhat.

The hydrophobic phase of the present printing ink can be prepared according to techniques conventional to one skilled in the art. Usually, the resin and the polyester are first dissolved in the non-polar solvent under heating. After cooling, the other components, namely a pigment, siccative, if any, thermally decomposable organic peroxide, activator and other additives used in some cases, such as fillers, are added to the obtained solution, and the mixture is milled in a conventional apparatus, such as a three-roller mill or a ball mill, to form a homogeneous mixture wherein the aqueous phase may be emulsified, as was described above. When a conventional organic peroxide or hydroperoxide is used together with a siccative, this peroxide has to be added yet afterwards, as was already described above.

A particularly interesting additive for the present printing ink are fine granules of a modified starch or a starch derivative having a limited swelling power under the influence of water, or of an other natural or synthetic substance having similar properties. These granules make yet an extra contribution towards the prevention of damage and transfer of the freshly printed ink layer, in particular when a printed sheet "lands" on the previously printed sheet in a sheet-fed printing process. The use of such granules in the printing ink constitutes the subject of Dutch patent application Ser. No. 76,00874 in the name of applicants.

Before and/or during printing said fine granules take up a little water, which may be extracted from the aqueous phase but which partly may also originate from the ambient air, from the printing plate and/or from the material to be printed. As a result of the absorption of water, which is even accelerated by the infra-red radiation, the fine granules swell somewhat but their swelling power is limited owing to the use of a suitably modified starch or a suitable starch derivative, so that only a slight increase of the granular size occurs and in fact globules are produced which slightly project above the printed ink layer and constitute bearing faces on which the following printed sheet "lands". Thus it is prevented that during said "landing" the still fresh ink layer of the previous sheet is damaged and is partly transferred to the reverse side of the "landing" sheet. The swelling of the granules may be no means be such that they burst open and pass into a sort of colloidal state, because then the contemplated effect can no longer be obtained. Therefore these granules are essentially different from the partially oxidized or modified starches, the granules of which are broken by gelatinization, and which may be used as modifying agents in the aqueous phase, as was described before.

The globules formed have the additional advantage that the freshly printed ink layer feels less sticky and that the printed sheets in a stack less easily stick together.

Preferably, the fine granules in dry state have an average size of about $10\mu$. The desired granular size can be obtained by screening the starch powder concerned. Particularly suitable starches are tapioca, wheat starch and in particular corn starch.

The swelling power of the fine granules used has to be limited, as was described above. In the printing ink the granules may occur in a somewhat swollen condition, but the swelling may not be too much, so that the average size of the swollen granules or globules does not exceed a value of about $20\mu$. For larger granules or globules cause troubles, such as sagging and sticking together, during the printing process. In order to attain the required limited swelling power of the granules, the starch is suitably modified or converted to a suitable starch derivative.

The modification can be carried out by treating the starch granules in a known manner with a preferably concentrated acid or with enzymes in order to effect a limited hydrolytic degradation, as a result of which there can, for example, be obtained modified starch granules having a fluidity (determined by an American testing method) of 50–60, which are particularly suitable for the object in view. An other known method to suitably modify starch granules consists in a controlled oxidizing treatment with oxidizing substances, such as a hypochlorite, hydrogen peroxide or a periodate. Particularly suitable is an oxidizing treatment with 3% active chlorine, originating from an alkali metal hypochlorite, in a neutral or weakly alkaline medium.

Suitable granular starch derivatives are esterification and etherification products of starch, for example of native starch having a high swelling degree, as a result of which a certain swelling-inhibitory effect is obtained. As starch esters may be mentioned acetyl starch and haloacetyl starch products. As starch ethers are eligible hydroxyethyl starch, hydroxypropyl starch, carboxymethyl starch and cyanoalkyl starch products.

The fine granules of a modified starch or a starch derivative are usually added to the printing ink in an amount of 0.1–2.0 wt.%, preferably 0.2–1.2 wt.%, calculated on the total ink. The optimum quantity to be used in a specific case of course depends on a number of factors, in particular the nature of the starch product used, the rest of the composition of the printing ink, as well as the manner of printing and the nature of the material to be printed, and can easily be determined by way of experiment.

According to a particularly suitable method to process the fine granules into the printing ink there is prepared beforehand a paste of said granules. Such a paste usually contains 15–40 wt.% fine granules of the modified starch or of the starch derivative and for the rest may be composed of a carrier liquid, for example water or an organic liquid such as hydrocarbon mixture, a binder, for example a known varnish for printing ink, and possibly aids such as waxes, surfactants etc. In this paste the fine granules may already be slightly swollen, so that the granular size lies between 10 and 15μ. Preferably, the paste is first mixed with the hydrophobic phase of the printing ink, so before the aqueous phase is emulsified therein. However, the paste may also be premixed with the aqueous phase or be added after the aqueous phase is already emulsified in the hydrophobic phase. Anyway, it may be assumed that in the printing ink ready for use the fine granules are present at least partly in the aqueous phase.

The printing ink according to the invention can be successfully employed in various printing processes. However, it is extremely suitable for relief printing (letterpress printing) or planographic printing, such as sheet-fed offset or rotary offset, it being possible to carry out both single-colour and multicolour printing, for example four-colour printing. Any conventional material, such as paper, cardboard or synthetic material, can be printed, it being important, however, that the printed surface is at least somewhat porous, so that it is capable to at least partly absorb the expelled non-polar solvent. When a totally imporous material, such as tin, is printed, it will only be possible to obtain a rapid drying if the present printing technique (ink plus infra-red radiation) is combined with known techniques of accelerated drying.

For carrying out he heat treatment, which in practice is an infra-red irradiation, infra-red lamps or elements are so arranged that they irradiate the still wet ink layer of the freshly printed material.

For several reasons there are preferably used infrared lamps which substantially, for example for more than 75%, radiate in the near infra-red, i.e. in the spectral range between 0.75 and 3 microns. Such lamps have the advantage that the supplied heat is substantially absorbed by the printed areas which have the highest optical density, while the non-printed, mostly white, areas for the greater part reflect the heat rays, so that the risk of excess heating and deformation of the printed material is avoided. Moreover, with this type of lamps the heating and cooling time are very short (only a few seconds), so that, when the printing machine is stopped, the paper remaining in front of the lamps cannot catch fire. Suitable infra-red lamps emitting in the near infra-red are the IRK-lamps having a power of 1000 or 2000 W of Philips N. V., Eindhoven (Netherlands).

A very rapid drying of the ink is also attained by means of infra-red lamps particularly emitting in the deep infra-red, i.e. in the spectral range between 3 and 10 microns. Elstein elements of 1000 W are an example of such lamps. However, they have the drawback that easily deformation of the printed paper occurs, because also the non-printed areas absorb great quantities of heat, and that the heating time (about 15 minutes) and the cooling time (about 10 minutes) are very long. The long afterglow can even set the stationary paper on fire.

The infra-red lamps are mostly arranged in a blowing-air cooled battery which extends over the total width of the printing machine. The power of the infrared lamps together varies of course as a function of several factors, such as the width of the printing machine, the distance to the printed material, the nature thereof, the composition of the printing ink etc. For the purpose of orientation it may be stated that, for example, in a four-colour rotary offset press having a paper web width of 1 m excellent drying results are obtained when the total power of the infra-red lamps lies between 25 and 35 kW. The time of irradiation is at most some tenths of a second.

In addition to the advantage already discussed above the invention offers yet a number of other advantages over the prior art printing inks and printing techniques. For example, the printed ink layer has a higher colour density, as a result of which a considerable saving of ink can be obatined. Furthermore there is observed an improvement of the print definition, and the dry ink layer has a considerably higher gloss as well as a much higher resistance to abrasion, so that the application of a final glossy protective layer can be omitted. Finally, the vapours liberated during drying can easily and efficiently be removed via a central discharge system, so that nuisance caused by stench is avoided. Also the still warm stack of freshly printed material can be connected to the discharge system, for example, via a plastic cover and a tube.

The invention will now be further explained by means of the following examples.

EXAMPLE I

At 200° C. there was prepared a solution (varnish) having the following composition:

| | |
|---|---|
| Krumbhaar Resin K 1400* (Lawter Chemicals, Chicago, U.S.A.) | 53 parts by weight |
| Trionol 7** (Lawter Chemicals) | 20 parts by weight |
| paraffin oil (petroleum distillate being 100% aliphatic in nature and having a boiling range of 260°–290° C.) | 27 parts by weight |

*a phenol formaldehyde resin modified with colophony and subsequently esterified with pentaerytritol (acid number <20; melding point Ring and Ball 160° C.; compatible with mineral oils having a Kb-value of about 27 in an amount of at least 1/1);
**a crosslinkable unsaturated polyester substantially consisting of linoleic acid (74%) and for the rest of isophtalic acid and pentaerytritol (acid number maximally 10; viscosity 20° C. 700 Poise; in all ratios compatible with mineral oils having a Kb-value of about 27).

A red ink for four-colour sheet-fed offset printing was prepared by mixing 18 parts by weight of pigment red 57 (CI 15,850) with 60 parts by weight of varnish and 5 parts by weight of paraffin oil, both as defined above, milling said mixture in a three-roller mill, adding at a temperature below 40° C. 2 parts by weight of dibenzoyl peroxide, properly mixing same, and finally emulsifying 15 parts by weight of an aqueous solution (a) uniformly in the hydrophobic phase.

Aqueous solution (a) was a 10% solution of a with 3% active chlorine oxidized corn starch, which subsequently was brought into solution by boiling. After cooling of the solution there was added 0.1% of paraformaldehyde as a preservative.

The thus prepared ink could be stored for a long time at normal temperature. After printing with this ink there was obtained a highly efficient and rapid drying of the ink layer by irradiating same for 0.1–0.2 seconds with IRK-lamps of 1000 W (about 85% of the radiation being in the range between 0.75 and 3 microns). Using only a relatively small amount of ink there was obtained yet a proper covering, and the printed and dried ink layer possessed an excellent gloss.

Analogous results were obtained by emulsifying, instead of the above-defined aqueous solution (a), an equal amount of one of the below-defined aqueous solutions (b)–(f) in the hydrophobic phase, in which connection it is observed, however, that with use of solution (f) in the long run demixing could be seen on the printing press:

(b) a 5% solution of a corn starch modified to a fluidity of 60 by means of hydrochloric acid, and which subsequently was brought into solution by boiling; to the cooled solution was added 0.1% paraformaldehyde;

(c) a 10% solution of a with 1.5% active chlorine oxidized potato starch, which subsequently was brought into solution by boiling; to the cooled solution was added 0.1% paraformaldehyde;

(d) a 1% solution of sodium carboxymethyl cellulose, to which was added 0.1% paraformaldehyde;

(e) a 1% solution of sodium alginate, to which was added 0.1% paraformaldehyde;

(f) a mixture consisting of 14 parts by weight of water, 3 parts by weight of isopropyl alcohol and 3 parts by weight of glycerol.

EXAMPLE II

A red ink for relief or letterpress printing was prepared by mixing 4 parts by weight of aluminium hydroxide and 17 parts by weight of pigment red 57 with 58 parts by weight of varnish, as described in Example I, milling said mixture in a three-roller mill, adding at a temperature below 40° C. 2 parts by weight of isobutyl peroxide and 4 parts by weight of paraffin oil (see Example I), properly mixing same, and finally emulsifying uniformly 15 parts by weight of one of aqueous solutions (a)–(f).

The thus prepared inks could be stored for a long time and, after printing and drying as in Example I, gave an excellent and rapid drying, a good covering and a high gloss.

EXAMPLE III

A red ink for rotary offset printing was prepared by mixing 12 parts by weight of pigment red 57 with 46 parts by weight of varnish, as described in Example I, milling said mixture in a three-roller mill, adding 20 parts by weight of paraffin oil (see Example I), once again properly mixing same, adding at a temperature below 40° C. 1 part by weight of isobutyl peroxide, and finally emulsifying uniformly 21 parts by weight of one of aqueous solutions (a)–(f).

The thus prepared inks could be stored for a long time and, after printing and drying as in Example I, gave an excellent and rapid drying, a good covering and a high gloss.

EXAMPLE IV

A paste was prepared by intimately mixing together the following components:

| | |
|---|---|
| varnish (prepared as described in Example I) | 1050 parts by weight |
| modified starch*** | 700 parts by weight |
| polyethylene wax | 100 parts by weight |
| water | 250 parts by weight |
| paraffin oil (see Example I) | 350 parts by weight |
| tridecyl alcohol | 50 parts by weight |

***Corn starch having a granular size of about 10 μ, which at 20° C. under stirring is treated with concentrated hydrochloric acid until a fluidity of about 55 is reached, after which the hydrolytic degradation is stopped by addition of sodium carbonate.

A red ink for four-colour sheet-fed offset printing was prepared by mixing 17 parts by weight of pigment red 57 with 60 parts by weight of varnish, as described in Example I, and 2 parts by weight of the paste as described above, milling said mixture in a three-roller mill, adding at a temperature below 40° C. 2 parts by weight of dibenzoyl peroxide and 4 parts by weight of paraffin oil (see Example I), properly mixing same, and finally emulsifying uniformly 15 parts by weight of one of aqueous solutions (a)–(f).

The thus prepared inks could be stored for a very long time and, after printing and drying as in Example I, gave an excellent and rapid drying, a good covering and a high gloss. During "landing" onto each other of the freshly printed sheets, which were dried by irradiation, absolutely no transfer of the ink layer took place.

I claim:

1. A printing ink which rapidly dries under the influence of heat, in particular from infra-red radiation, characterized in that in addition to a hydrophobic phase which is composed of a non-polar solvent, a binder formed from a phenol- or cresol formaldehyde resin modified with colophony or with colophony and a polyhydric alcohol, a crosslinkable unsaturated polyester, the weight ratio of the solvent, the resin and polyester is such that the two latter components are present in dissolved state, but the resin is no longer soluble after the polyester has been crosslinked, and as a result has disappeared from the solution, a peroxide catalyst for said polyester present in the amount of 1–6 wt.% of said binder, and an effective pigment, the ink comprising an aqueous phase constituting 12–40 wt.% of the total ink, the aqueous phase having a relative low viscosity and being emulsified in the hydrophobic phase, and a thickener being incorporated in the amount of 0.5-20 wt.% of the aqueous phase, the nature and amount of the thickener being so selected that the viscosity of the aqueous phase is substantially equal to the viscosity of the hydrophobic phase.

2. A printing ink according to claim 1, characterized in that the aqueous phase constitutes 15-25 wt.% of the total ink.

3. A printing ink according to claim 1, characterized in that the thickener is a partially oxidized or degraded starch which has been rendered soluble by gelatinization.

4. A printing ink according to claim 1, characterized in that furthermore an effective bactericide is incorporated in the aqueous phase.

5. A printing ink according to claim 1, characterized in that the non-polar solvent is a hydrocarbon mixture.

6. A printing ink according to claim 1, characterized in that the unsaturated polyester is composed of a polyhydric alcohol, a phthalic acid component and an unsaturated aliphatic carboxylic acid.

7. A printing ink according to claim 1, characterized in that the peroxide catalyst is an organic peroxide which is decomposed at a temperature between 70° and 80° C. with formation of free radicals.

8. A printing ink according to claim 1, characterized in that the weight ratio of the resin and polyester together to the non-polar solvent is greater than 1/1, while the weight ratio of the resin only to the solvent is smaller than 1/1.

9. A printing ink according to claim 1, characterized in that the ink contains as additive fine granules of a modified starch or a starch derivative having a limited swelling power under the influence of water, and of which the average granular size preferably is not more than 20μ.

10. A printing ink according to claim 9, characterized in that the added fine granules are present in an amount of 0.1-2.0 wt.%, calculated on the total ink.

11. A printing process, in particular a planographic or relief printing process, in which is employed a printing ink according to claim 1 for printing a material which is capable of absorbing the non-polar solvent of the printing ink, and the printed material is exposed to the influence of heat, in particular from infra-red radiation.

12. A printing process according to claim 11, characterized in that the infra-red radiation substantially lies in the near infra-red.

13. Printed material, obtained by the process according to claim 11.

* * * * *